3,813,445
PREPARATION OF DIHYDROXYBIPHENYLS
Stephen N. Massie, Palatine, Ill., assignor to Universal
Oil Products Company, Des Plaines, Ill.
No Drawing. Continuation-in-part of abandoned application Ser. No. 857,555, Sept. 12, 1969. This application Oct. 3, 1972, Ser. No. 294,721
Int. Cl. C07c 39/12
U.S. Cl. 260—620     7 Claims

ABSTRACT OF THE DISCLOSURE

Dihydroxy-substituted biphenyls are synthesized by treating phenol with a stable acidic catalyst at elevated temperatures.

CROSS-REFERENCE TO RELATED APPLICATION

This application is a continuation-in-part of my co-pending application Ser. No. 857,555, filed Sept. 12, 1969, now abandoned.

This invention relates to a process for the synthesis of dihydroxy-substituted biphenyls. More specifically, the invention is concerned with a process for treating phenol with a stable acid acting catalyst to synthesize the desired product.

The products which result from the treatment of phenol with a stable acid acting catalyst will comprise dihydroxy-substituted biphenyls. Thus, the dihydroxy-substituted biphenyl such as 4,4'-dihydroxybiphenyl which may be prepared according to the process of this invention will be a valuable intermediate in the preparation of certain polymeric compounds. For example, the aforesaid 4,4'-dihydroxybiphenyl will be used in the preparation of epoxy resins and due to the para-orientation of the hydroxyl group and the aromatic-aromatic linkage of the phenol moieties will render the compound more in a single plane than when a compound such as bisphenol-A is used. Thus, the use of the dihydroxybiphenyl will permit the preparation of epoxy resins which are more rigid and refractive than the epoxy resins which are prepared by the condensation of epichlorohydrin with the aforementioned bisphenol-A. In addition, the isomeric dihydroxybiphenyls such as 2,4'-dihydroxybiphenyl or 2,2'-dihydroxybiphenyl may also be used in the preparation of other polymeric compounds similar in nature to those which are utilized as fibers in the manufacture of synthetic materials such as textiles.

Heretofore, it is known in the prior art that hydroxy substituted aromatic compounds such as phenol may be treated with an acid, which is unstable at the reaction conditions which are used, to form derivatives of the phenol. Thus, for example, phenol may be treated with an unstable acid such as sulfuric acid or nitric acid to form sulfonated compounds or nitrated compounds. In this reaction the acid enters into a ring substitution in either an ortho, meta or para position to the phenol. However, in contradistinction to this, the present invention is concerned with a process for the self-condensation of phenol in the presence of certain stable acid acting catalysts to prepare compounds which may be subjected to uses hereinbefore set forth. Therefore, the purposes of this application, a stable acid is one which will not form derivatives with the aromatic compound at less than 400° C. in which a portion of the acid is incorporated into the aromatic compound.

Accordingly, it is therefore an object of this invention to provide a process for preparing dihydroxy-substituted biphenyls.

A further object of this invention is to provide a process for the self-condensation of phenol in the presence of certain catalytic compositions of matter of a type hereinafter set forth in greater detail.

In one aspect an embodiment of this invention resides in a process for the preparation of a dihydroxybiphenyl which comprises treating phenol with a stable acid catalyst at a temperature in the range of from about 200° to about 400° C. and a pressure in the range of from about atmospheric to about 100 atmospheres, and recovering the resultant dihydroxybiphenyl.

A specific embodiment of this invention is found in a process for the preparation of a dihydroxy-substituted biphenyl which comprises treating phenol with hydrogen fluoride at a temperature in the range of from about 200° to 400° C. and a pressure in the range of from about atmospheric to about 100 atmospheres and recovering the resultant 4,4'-dihydroxybiphenyl.

Other objects and embodiments will be found in the following further detailed description of the present invention.

As hereinbefore set forth the present invention is concerned with a process for the preparation of dihydroxy-substituted biphenyl compounds, the reaction being effected by treating phenol with a catalyst comprising a stable acidic compound at reaction conditions. The self-condensation reaction conditions will include temperatures in the range of from about 200° to about 400° C. and preferably in a range of from about 200° to about 300° C. Generally speaking, the process of this invention is also effected at atmospheric pressure, although it is contemplated within the scope of this invention that superatmospheric pressure ranging up to about 100 atmospheres may be employed. In the event that superatmospheric pressures are to be employed, the pressures are provided for by the introduction of a substantially inert gas such as nitrogen into the reaction zone, the amount of pressure which is employed being that which is sufficient to maintain a major portion of the reactants in the liquid phase.

Examples of acidic compounds which are stable in nature and which will not take part in the reaction by substitution into the ring of the phenol will include concentrated phosphoric acid, concentrated hydrochloric acid, hydrogen fluoride, etc.; heterogeneous acidic site catalysts such as alumina, silica, silica-alumina, aluminosilicates of specific crystal structure such as the mordenites and the faujasites, both synthetic and naturally occurring, etc. As hereinbefore set forth the basic criteria which may be followed in employing the various catalysts hereinbefore set forth is that said catalysts be stable in nature and not one which will enter into the reaction.

The process of this invention may be effected in any suitable manner and may comprise either a batch or continuous type operation. When a batch type operation is used, a quantity of the starting material which comprises phenol is placed in an appropriate apparatus along with the stable acidic catalyst. The particular reaction apparatus may comprise a flask in the event that the reaction is to be effected at near atmospheric pressure. Conversely speaking, if the reaction is to be effected at super-atmospheric pressure, the reaction apparatus will comprise a pressure-resistant vessel such as an autoclave of the rotating or mixing type. In the event that the latter system is employed, the autoclave is sealed and an inert gas such as nitrogen is pressed in until a superatmospheric pressure within the range hereinbefore set forth has been reached. Following this the autoclave and contents thereof are heated to the desired operating temperature which is in excess of 200° C. and maintained thereat for a predetermined period of time which may range from about 0.5 up to about 10 hours or more in duration. At the end of this time, the autoclave and contents thereof are allowed to return to room temperature, the excess pressure is discharged and the reaction mixture is recovered. If the reaction vessel consists of a flask, it and the reaction mixture are treated in a similar manner, that is, by allowing the flask and contents thereof to return to room temperature and recovering the reaction mixture. The reaction product may be separated from the catalyst by conventional means such as filtration if a heterogeneous acidic site catalyst in solid form is used, or, if so desired, it may be subjected to a neutralization step by the addition of a strong base. The aqueous layer is then separated from the organic layer, the latter being extracted, washed and dried and thereafter subjected to fractional distillation or crystallization, whereby the separated isomeric dihydroxy-substituted biphenyls are separated and recovered. In the event that a stable acid catalyst such as hydrogen fluoride in anhydrous form is used, the catalyst is charged to an autoclave after the liner has been sealed into said autoclave and the reaction allowed to proceed. After completion of the desired residence time, the hydrogen fluoride is carefully discharged by purging the autoclave with a stream of nitrogen gas for a period which may range up to about 2 hours or more and thereafter the autoclave is subjected to conventional means of neutralization prior to opening said autoclave and recovering the reaction product. In addition, the reaction product is also neutralized by the addition of sodium carbonate or other basic solutions in the manner known in the art inasmuch as hydrogen fluoride is extremely corrosive in nature and care must be taken to prevent the occurrence of any untoward accidents.

It is also contemplated within the scope of this invention that the process described herein may be effected in a continuous manner of operation. When such a type of operation is used, the phenol which is to be treated in a self-condensation reaction is continuously charged to a reaction zone which is maintained at the proper operating conditions of temperature and pressure. The stable acidic catalyst, if in liquid form, is also charged to the reaction zone through a separate line or, if so desired, the catalyst may be admixed with the phenol prior to entry into said zone and the mixture charged thereto in a single stream. After completion of the desired residence time, the reaction effluent is continuously withdrawn from the reaction zone and subjected to standard and conventional means of separation whereby the catalyst and any unreacted starting materials are separated from the isomeric dihydroxy-substituted biphenyls. The latter are removed and, if so desired, are subjected to further separation steps in which the various isomers such as the 4,4'-, 2,2'-, and 2,4'-dihydroxy substituted biphenyls are separated and recovered, while the unreacted phenol and catalyst are recycled to the reaction zone for further use as starting materials.

When utilizing the stable heterogeneous acidic site catalyst of the type hereinbefore set forth in greater detail, it is possible to effect a continuous manner of operation in any one of three ways. One particular method of effecting this operation is the fixed bed method in which the solid heterogeneous acidic site catalyst such as alumina or faujasite is disposed as a fixed bed in the reaction zone while the phenol is passed over the said bed in either an upward or downward flow. Another method of effecting the process of this invention is the moving bed type of operation in which the catalyst and the phenol pass through said reaction zone either concurrently or countercurrently to each other. Yet another type of operation which may be utilized comprises the slurry type in which the solid catalyst is carried into the reaction zone as a slurry in the phenol. In each of these types of operations, the reactor effluent is withdrawn and subjected to conventional means of separation whereby the desired product comprising a dihydroxy-substituted biphenyl is recovered while any catalyst and unreacted phenol may be recovered and further utilized as starting materials in the continuous operation.

The following examples are given to illustrate the process of the present invention which, however, are not intended to limit the generally broad scope of the present invention in strict accordance therewith.

EXAMPLE I

In this example 47.0 g. (0.5 mol) of phenol along with 2.0 g. (0.02 mol) of concentrated phosphoric acid are charged to the glass liner of a rotating autoclave. The liner is sealed into the autoclave and nitrogen is pressed in until an initial pressure of 30 atmospheres is reached. The autoclave and contents thereof are heated to a temperature of 275° C. and maintained thereat for a period of 6 hours. At the end of this time, heating is discontinued and the autoclave is allowed to return to room temperature. After the excess pressure has been discharged, the autoclave is opened and the reaction mixture is recovered. The organic layer is separated from the aqueous catalytic layer, washed, dried and subjected to fractional distillation under reduced pressure to remove unreacted phenol, the desired product comprising crude 4,4'-dihydroxybiphenyl is recovered from the bottoms and is purified by recrystallization from toluene.

EXAMPLE II

In this example 47.0 g. of phenol are charged to the liner of a turbomixer autoclave which is thereafter sealed into the autoclave. The stable acid catalyst comprising hydrogen fluoride in anhydrous form is thereafter charged to the autoclave and, in addition, nitrogen is also pressed in until an initial pressure of 30 atmospheres is reached. The autoclave is then heated to a temperature of 225° C. and maintained thereat for a period of 6 hours, at the end of which time heating is discontinued. After the autoclave has returned to room temperature, the hydrogen fluoride is swept out of the autoclave by utilizing a purge stream of nitrogen for a period of 2 hours before opening the autoclave. The reaction mixture which is recovered upon opening the autoclave is treated to remove any residual hydrogen fluoride which still may be present. The treated solution is extracted, washed, dried and subjected to fractional distillation under reduced pressure whereby the desired product comprising 4,4'-dihydroxybiphenyl is recovered as a concentrate in the bottoms. Subsequent recrystallization will yield the pure product.

EXAMPLE III

To a glass-lined pressure vessel provided with heating and stirring means is added 47.0 g. of phenol along with 5.0 g. of the acid form of a faujasite. The flask is then heated to a temperature of 250° C. and maintained thereat for a period of 4 hours, the reaction mixture being constantly stirred during this period. At the end of the 4-hour period, heating is discontinued and the flask and contents thereof are allowed to return to room temperature. The reaction mixture is separated from the faujasite catalyst by filtration and treated in a manner similar to that hereinbefore set forth in the above examples whereby the isomeric dihydroxybiphenyls, namely, 2,4'-dihydroxybiphenyl and 4,4'-dihydroxybiphenyl are separated and recovered.

I claim as my invention:

1. A process for the preparation of a dihydroxybiphenyl which comprises treating phenol, at a temperature in the range of from about 200° to about 400° C. and a pressure in the range of from about atmospheric to about 100 atmospheres, with a catalytically effective amount of a stable acidic catalyst selected from the group consisting of phosphoric acid, hydrochloric acid, hydrogen fluoride, alumina, silica, silica-alumina, mordenites and faujasites, and recovering the resultant dihydroxybiphenyl.

2. The process as set forth in claim 1, further characterized in that a substantially inert gas is introduced to provide a superatmospheric pressure.

3. The process as set forth in claim 1 in which said stable acidic catalyst is hydrogen fluoride.

4. The process as set forth in claim 1 in which said stable acidic catalyst is phosphoric acid.

5. The process as set forth in claim 1 in which said stable acidic catalyst is a faujasite.

6. The process as set forth in claim 1 in which said dihydroxybiphenyl is 4,4'-dihydroxybiphenyl.

7. The process as set forth in claim 1 in which said dihydroxybiphenyl is 2,4'-dihydroxybiphenyl.

References Cited

UNITED STATES PATENTS

| 2,057,676 | 10/1936 | Graves | 260—620 X |
| 2,490,282 | 12/1949 | Seubold et al. | 260—620 X |
| 2,885,444 | 5/1959 | Hope et al. | 260—620 |

OTHER REFERENCES

Gilbert: "Sulfonation and Related Reactions," pp. 78, 79 and 113, 1965.

LEON ZITVER, Primary Examiner

N. MORGENSTERN, Assistant Examiner